United States Patent [19]

Jurczyszyn et al.

[11] Patent Number: 4,701,013
[45] Date of Patent: Oct. 20, 1987

[54] OPTICAL SOURCE WITH OPTICAL FIBER CARRIER

[75] Inventors: Michel Jurczyszyn; Michel Marchand, both of Ivry sur Seine, France

[73] Assignee: Compagnie Industrielle des Telecommunications, Paris, France

[21] Appl. No.: 797,548

[22] Filed: Nov. 13, 1985

[30] Foreign Application Priority Data

Nov. 13, 1984 [FR] France ................. 84 17297

[51] Int. Cl.⁴ .................................. G02B 6/42
[52] U.S. Cl. ................ 350/96.20; 219/86.9; 219/87
[58] Field of Search ........... 350/96.15, 96.17, 96.18, 350/96.20, 96.21; 219/86.1, 86.24, 86.9, 87

[56] References Cited

U.S. PATENT DOCUMENTS

| 4,167,744 | 9/1979 | Nyul | 350/96.20 X |
| 4,237,474 | 12/1980 | Ladany | 350/96.20 X |
| 4,296,998 | 10/1981 | Dufft | 350/96.20 |
| 4,523,802 | 6/1985 | Sakaguchi et al. | 350/96.20 X |

FOREIGN PATENT DOCUMENTS

| 0104882 | 4/1984 | European Pat. Off. |
| 3307669 | 9/1984 | Fed. Rep. of Germany |
| 2311325 | 12/1976 | France |
| 2372444 | 6/1978 | France |
| 2446497 | 8/1980 | France |
| 2488699 | 2/1982 | France |
| 55-36930 | 3/1980 | Japan |
| 59-94725 | 5/1984 | Japan .............. 350/96.17 |

Primary Examiner—John Lee
Attorney, Agent, or Firm—Sughrue, Mion, Zinn, Macpeak & Seas

[57] ABSTRACT

An optical source comprises a base on which a light-emitting component is mounted. A fiber-carrier in the form of a slab is fastened to the base. An optical fiber mounted on the fiber-carrier has an end optically coupled to the light-emitting component. An intermediary part in the form of a narrow slab with plane surfaces is attached to the base. The fiber-carrier is spot soldered to the intermediary part using an electrical resistance soldering process.

9 Claims, 4 Drawing Figures

OPTICAL SOURCE WITH OPTICAL FIBER CARRIER

BACKGROUND OF THE INVENTION

1. Field of the invention

The present invention concerns optical telecommunications. It relates to an optical source comprising a light-emitting component, more specifically a laser diode coupled to the end of an optical fiber and intended in particular for monomode submarine links.

2. Description of the prior art

In making up a source of this kind it is important to fix the optical fiber in alignment with the laser diode so as to obtain optimal coupling and minimal variation of coupling with time during use of the optical source.

Document Nos. Wo-A-79/00099 describes a method of coupling a laser diode of this kind to an optical fiber. According to this document, the laser diode is mounted on one of the branches of a U-shaped base and the optical fiber is supported by a fiber-carrier which is itself fixed to the other branch of the U-shaped base. The position of the optical fiber in the fiber-carrier and that of the fiber-carrier on the branch of the U-shaped base are adjusted dynamically, by energizing the laser diode and measuring the power of the signal delivered by the fiber, so as to identify the optimum positional adjustment of the optical fiber relative to the laser diode.

These adjustments are carried out firstly by displacing the optical fiber in the fiber-carrier which is at this stage fixed relative to the laser diode, in a direction Z substantially perpendicular to the surface of the laser to be coupled to the fiber; after this first adjustment the fiber is fixed to the fiber-carrier. Further adjustment is then effected by displacing the fiber-carrier relative to the laser diode, in directions X and Y perpendicular to the previous direction Z. The fiber-carrier is then fixed to the U-shaped base.

The optical fiber is glued to the fiber-carrier and the fiber-carrier is glued to the U-shaped base.

This method of fixing using glue has disadvantages. Specifically, it entails the risk of degassing and pollution of the active optical surfaces, and does not procure sufficient long-term stability and reliability, by virtue of the strong tendency of the organic materials used for such fixings to creep. Also, this fixing method is found to be difficult to employ in practice in the case where the fiber is a monomode fiber the core diameter of which is very small, of the order of a few microns.

U.S. Pat. No. 4,296,998 also describes a method of coupling a laser diode to a fiber. According to this document, the position of the fiber relative to the laser diode is also adjusted dynamically in three dimensions, firstly the direction Z, then the direcitons X and Y; the fixing of the fiber in order to immobilize it in the direction Z and then in the directions X and Y makes use of a gas laser soldering technique. In the embodiment described, the laser diode is mounted on a base featuring a plinth carrying a mass of solder facing the laser diode. An opening through the mass of solder has a diameter which is large relative to the diameter of the fiber, which is inserted into it and can move within it. The appropriate areas of the fiber are previously coated with a layer of metal, to facilitate the adhesion of the solder to these areas. After the position of the fiber is adjusted dynamically, the mass of solder is melted using a gas laser and, on subsequently resolidifying, immobilizes the fiber.

This laser soldering fixing method necessitates appropriate tooling. This operation is also very delicate to implement, because of the proximity of the active surfaces of the laser diode and of the fiber; moreover, this fixing method does not eliminate a slight inaccuracy as to the final positioning of the fiber, due to the expansion and then contraction of the mass of solder during the process of embedding the fiber.

The present invention is directed towards the implementation of an optical source in which the adjustment of the position of the fiber relative to the laser diode is also effected dynamically in three dimensions and in which the relative fixing of the fiber and of the laser diode, while using soldering techniques, requires only very simple tooling and enables the aforementioned disadvantages to be avoided.

SUMMARY OF THE INVENTION

An object of the present invention is an optical source comprising a base, a light-emitting component mounted on said base, a fiber-carrier in the form of a slab fastened to said base, an optical fiber mounted on said fiber-carrier and having an end optically coupled to said light-emitting component and an intermediary part in the form of a narrow slab with plane surfaces attached to said base and to which said fiber-carrier is spot soldered using an electrical resistance soldering process.

According to one specific feature of the invention the soldered joints between said fiber-carrier and said intermediary part are situated on their contacting surfaces, in areas of these parts projecting laterally to each side of the base. In line with these soldered joints the fiber carrier features two outwardly open blind holes enabling the thickness of this part to be reduced in the soldered areas and receiving the mobile soldering electrodes.

In accordance with another specific feature of the invention, said fiber is secured on said fiber-carrier by a resilient tang and partially embedded with said resilient tang in a mass of solder.

The characteristics and advantages of the present invention will emerge from the following description of one embodiment given with reference to the appended drawings.

DESCRIPTION OF THE PREFERRED EMBODIMENT

Figure 1:
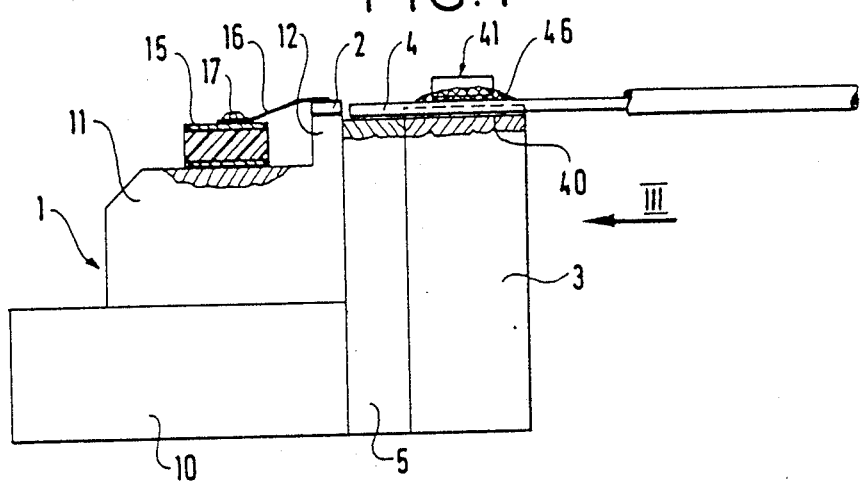
FIG. 1 is a view in elevation of the optical source in accordance with the invention.
Figure 2:
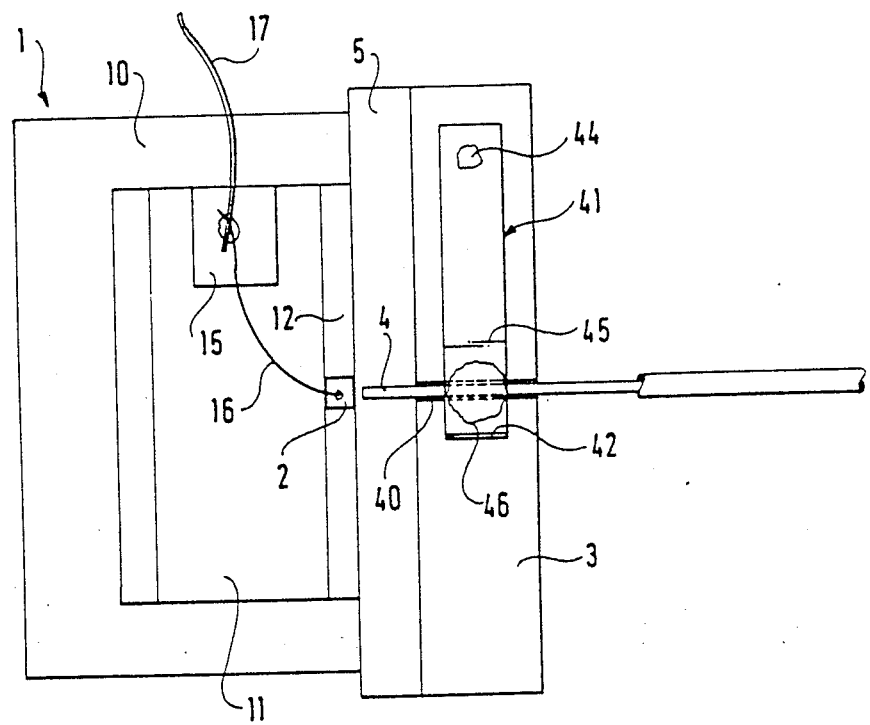
FIG. 2 shows the same optical source seen from above.
Figure 3:
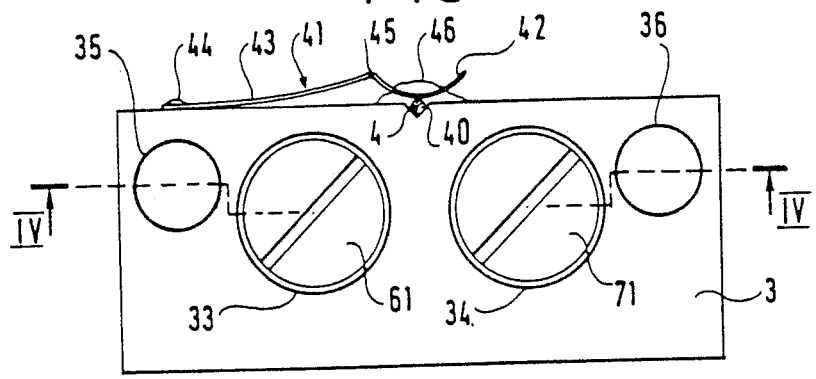
FIG. 3 is a view of the optical source from the side, in the direction of the arrow III in FIG. 1.

The optical source shown in the drawings comprises three sub-assemblies disposed side-by-side and assembled to one another:

a base 1 carrying on its top surface a light-emitting component 2, advantageously a laser diode, a fiber-carrier 3 in the form of a small slab carrying on one if its smaller sides, called the top surface, an optical fiber pigtail 4, and an auxiliary part 5 also in the form of a small slab, narrower than the fiber-carrier, disposed between the base and the fiber-carrier to assemble them together and referred to as the intermediary part.

The base 1 forms a plinth 10 surmounted by a parallelepipedal pedestal 11 carrying the laser diode, the pedestal being set back from the edge of the plinth on three of its four sides. The laser diode is mounted on the pedestal so as to have its emission surface coupled to the fiber pigtail 4 disposed substantially in the plane defined by the plane lateral surface of the base 1. For improved positioning the laser diode is mounted on a fine rib 12 formed between this plane lateral surface and the top surface of the pedestal.

The base also carries a small insulative block 15, of alumina, for example. This block 15 is attached to the top surface of the pedestal 11. The block 15 has its two opposite larger surfaces metalized; one of them is fixed by brazing to the top surface of the pedestal (as an alternative it may not be metalized and may then be glued to the top surface of the pedestal), and the other, designed to provide for electrical interconnections with the laser diode, receives a gold wire 16 connected to the laser diode and a thicker exterior conductor wire 17.

The base further features two threaded holes 13 and 14 parallel to one another at substantially the mid-height of the pedestal 11 and opening into the plane surface of the base and the opposite side.

The base 1 is of a material which is a very good conductor of heat. It is made of copper.

The intermediary part 5 forms a small, narrow parallelepipedal slab. Its height is substantially equal to that of the base, including the rib 12; one of its two larger lateral surfaces is applied against the plane lateral surface of the base, projecting beyond the pedestal 11 on each side. This intermediary part features two holes 53, 54 opening into its lateral larger surfaces and in corresponding relationship with the threaded holes 13 and 14 in the base.

It is fixed to the base 1 by two screws 6 and 7 the shanks 60, 70 of which are inserted through the holes 53 and 54 in the intermediary part 5 into the threaded holes 13 and 14 in the base and the heads 61, 71 of which are immobilized externally on the edges of the holes 53 and 54. The combination of the base 1 and intermediary part 5 thus forms a composite base.

The fiber-carrier 3 is also in the form of a small parallelepipedal slab, of substantially the same size as the intermediary part although slightly thicker than it. It is fixed to the other lateral larger surface of the intermediary part 5 by masses of solder 31 and 32.

Figure 4:
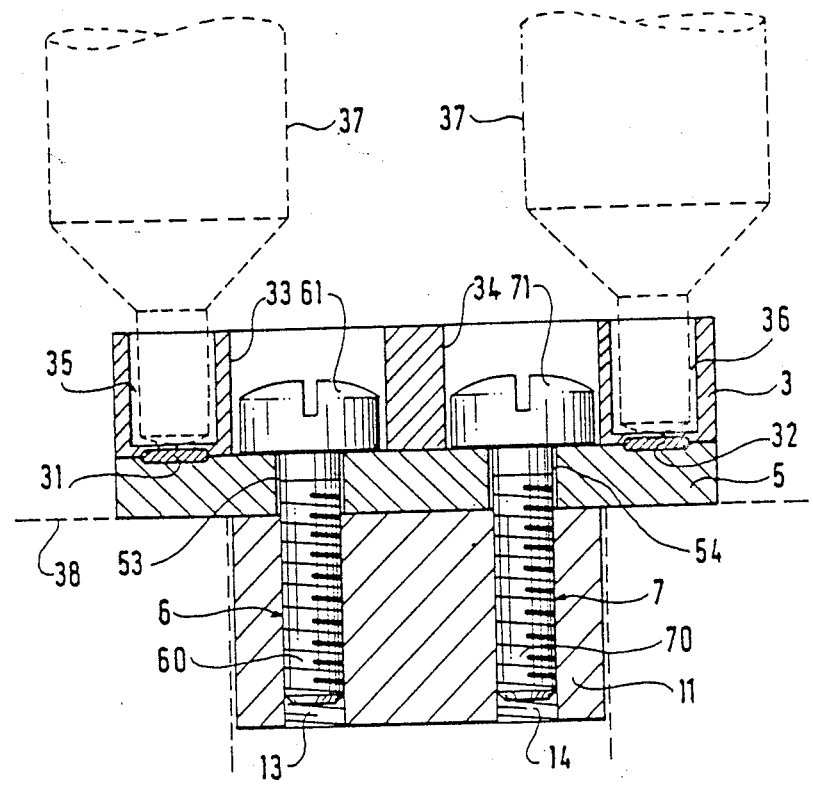
FIG. 4 is a view of the optical source in cross-section on the line IV—IV in FIG. 3.

The fiber-carrier 3 also features, in corresponding relationship to the threaded holes 13 and 14 in the base 1 and the holes 53 and 54 in the intermediary part 5, two holes 33 and 34. These holes open onto the two larger surfaces of the fiber-carrier; they serve to accommodate the heads 61, 71 of the screws 6 and 7 and make them accessible from the outside. To either side of these two through holes 33 and 34, it also features two blind holes 35 and 36 formed in the portions which, with the corresponding ones in the intermediary part 5, project laterally relative to the pedestal 11. The blind holes open into the lateral larger surface of the fiber-carrier, on the outside of the resulting final assembly. As shown in dashed line in FIG. 4, they are designed to accommodate the tips of mobile electrodes 37 cooperating with a fixed electrode 38 maintained in bearing engagement, facing these tips, against the portions of the intermediary part 5 which project relative to the pedestal, for assembling together these two parts 3 and 5 by electrical resistance soldering. The depth of these blind holes also advantageously reduces the thickness of the fiber-carrier where soldered.

This fiber-carrier 3 also features on its top surface (in the final assembly) a V-shaped groove 40 machined across its full width and substantially at its center. This V-shaped groove provides an easy way of positioning the fiber pigtail 4. On this same top surface it also carries a resilient tang 41 an end part 42 of which is arcuate and forms a spring whereas the other, substantially linear part 43 is used to fix it by means of an electric resistance solder joint 44 at its end. The arcuate part 42 has its convex surface extending transversely to the groove 4 on which it is centered and comes into substantial bearing engagement with its edges. The portions 42 and 43 of this resilient tang define between them a sharp bent edge 45 on the outside.

This resilient tang 41 forms a means of temporarily securing the fiber pigtail 4 for adjusting its position relative to the emitting surface of the laser diode 2, before its final fixing achieved, during dynamic adjustment of its position, by a mass of solder 46 between the fiber-carrier 3, the fiber pigtail 4 and the resilient tang 41. The fiber pigtail 4 initially receives for this purpose a surface metal coating in this area, where it is stripped, its plastics sheath being removed over a length substantially greater than the thickness of the combination of the fiber-carrier 3 and the intermediary part 5 when assembled together.

The fiber-carrier 3 and the intermediary part 5 assembled together by electric resistance soldering are both carefully machined so as to have very flat surfaces, in particular, their larger surfaces in contact. Both are of a material chosen to be compatible with this assembly method without requiring high electrical power, but also easily machinable and further featuring a coefficient of thermal expansion comparable with that of the material of the base 1.

For a copper base, these two parts are in a stain-resistant alloy of nickel-copper-zinc, such as that commercially available under the designation Arcap.

This method of assembly is quick and easy. It causes only minimal heating of the outside surfaces of the parts to solder so that very little heat is transmitted to the base 1. Moreover, the volume of metal heated for this soldering without external heat input is minimized; no deformation or internal tension occurs.

The optical head is made in the following consecutive stages:

a preliminary stage of preparing and inspecting the sub-assemblies leading on the one hand to the assembly of the intermediary part 5 onto the base 1 carrying the laser diode 2 and on the other hand to the fiber-carrier 3 carrying the metal-coated fiber pigtail 4 which is simply secured in the V-shaped groove by the resilient tang;

a first stage of dynamic adjustment of the fiber pigtail relative to the laser diode using a micromanipulator on the fiber pigtail, assigned to the axial adjustment of the fiber pigtail, in the aforementioned direction Z, leading to the soldering of the fiber pigtail to the fiber-carrier secured relative to the base and the intermediary part assembled to it;

a second stage of dynamic adjustment of the fiber pigtail fixed to the fiber-carrier, using a micromanipulator on the assembly comprising the base and intermediary part, assigned to the X and Y direction adjustment previously mentioned of the fiber pigtail, leading to the insertion under pressure of the mobile electrodes into the blind holes in the fiber-carrier and to the soldering of this fiber-carrier to the intermediary part; and a final stage of inspecting the quality of the coupling between the laser diode and the fiber pigtail in the optical source obtained.

This method of producing the optical head in accordance with the invention has numerous advantages. Apart from those resulting from the electrical resistance soldering of the intermediary part rather than the base 1 directly, using simple tooling, it is possible after the operation to solder the fiber-carrier to the intermediary part to compensate any slight misalignment occurring on insertion under pressure of the mobile electrodes into the fiber-carrier and detected during the final stage of inspecting the quality of the coupling obtained. This compensation is obtained using the screws fixing the intermediary part to the base 1, the heads of which are accessible through the fiber-carrier and the shanks of which pass through the intermediary part with the possibility of a slight clearance in the holes passing through this intermediary part.

This method of indirectly fixing the fiber-carrier to the base also makes it possible, in the case of excessive misalignment, to recover the assembly comprising the base and the laser diode, which will not have been subjected to any deterioration, in particular of the surface, during the assembly of the optical source concerned, which is in this case defective, in order to reutilize it in a new optical source.

The present invention has been described with reference to one example of embodiment shown in the appended drawings. It is obvious that modifications of detail may be made to it and/or that certain means may be replaced by other technically equivalent means.

There is claimed:

1. Optical source comprising: a base, a light-emitting component mounted on said base, a fiber-carrier in the form of a slab fastened to said base, an optical fiber mounted on said fiber-carrier and having an end optically coupled to said light-emitting component and an intermediary part in the form of a narrow slab with plane surfaces fixed to said base on one side and spot soldered to said fiber-carrier on the other.

2. Optical source according to claim 1, wherein said intermediary part and said fiber-carrier both project laterally beyond said base on each side thereof and said fiber-carrier has at least two blind holes in its portions projecting laterally relative to said base which holes open onto its outside surface in the finished assembly and said holes receiving mobile electrodes cooperating with a fixed electrode held facing the end of said mobile electrodes against the corresponding portion of said intermediary part, to facilitate electrical resistance soldering assembly thereof.

3. Optical source according to claim 1, wherein said intermediary part has two smooth through holes and said base has two threaded holes corresponding to said smooth through holes and screws carried thereby screwing together said intermediary part and said base.

4. Optical source according to claim 3, wherein said fiber-carrier has two through holes in its thickness corresponding to said holes in said intermediary part and said base and accommodating screwheads of said screws accessible from outside the assembly.

5. Optical source according to claim 1, wherein said light-emitting component is mounted on a rib of said base formed in alignment with its side surface bearing on said intermediary part.

6. Optical source according to claim 1, wherein said fiber-carrier carries on one of its smaller sides forming a top surface in the final assembly, a resilient tang for temporarily securing said fiber during dynamic axial adjustment of said optical fiber relative to said light-emitting component, and a mass of solder on the top surface of said fiber-carrier at least partially fixing said fiber.

7. Optical source according to claim 6, wherein said fiber-carrier has on its top surface a V-shaped groove within which said fiber is positioned, said tang including an arcuate part which extends in a transverse direction over said fiber having a convex surface centered on said groove and being in substantial bearing engagement with its edges.

8. Optical source according to claim 1, wherein said base is of a thermally conductive material and said intermediary part and said fiber-carrier are of a material that can be machined and electrical resistance soldered, having thermal expansion properties comparable with those of the material of said base.

9. Optical source according to claim 8, wherein said base is of copper and said intermediary part and said fiber-carrier are of a stain-resistant alloy of nickel, copper and zinc.

* * * * *